United States Patent

Hoshigami et al.

Patent Number: 5,477,532
Date of Patent: Dec. 19, 1995

[54] RADIO TRANSCEIVER

[75] Inventors: Hiroshi Hoshigami; Atsushi Utsugi; Mikio Takano, all of Ohme; Yoichi Takahashi, Iruma, all of Japan

[73] Assignee: Kokusai Electric Co., Tokyo, Japan

[21] Appl. No.: 139,515

[22] Filed: Oct. 15, 1993

[30] Foreign Application Priority Data

Oct. 22, 1992 [JP] Japan ................................. 4-307975

[51] Int. Cl.⁶ .............................. H04L 5/14; H04B 1/52
[52] U.S. Cl. ................................. 370/24; 455/82; 455/83
[58] Field of Search .......................... 455/250.1, 295, 455/311, 78, 82, 254, 83, 226.2, 79; 370/24, 27, 77, 31, 32, 38, 40, 51, 52

[56] References Cited

U.S. PATENT DOCUMENTS

| | | | |
|---|---|---|---|
| 4,525,863 | 6/1985 | Stites | 455/83 |
| 4,853,972 | 8/1989 | Ueda et al. | 455/78 |

*Primary Examiner*—Benedict V. Safourek
*Assistant Examiner*—Ajit Patel
*Attorney, Agent, or Firm*—Emmanuel J. Lobato

[57] ABSTRACT

A radio transceiver is disclosed in which an antenna is connected to a transmitter or a receiver through a duplexer. A controller is provided to control the switching operation of the duplexer so that when an output of the receiver exceeds a predetermined maximum threshold level of the receiver, the antenna is connected to the transmitter through the duplexer while a leakage received power of the duplexer is applied to the input of the receiver.

2 Claims, 3 Drawing Sheets

RADIO TRANSCEIVER

BACKGROUND OF THE INVENTION

This invention relates to a radio transceiver and, more particularly, to a radio transceiver for use in a digital cordless telephone system called a PHP (Personal Handy Phone) system which has been proposed as a second-generation cordless telephone.

In a cordless telephone system which is one of mobile communication systems, voice or the like is transmitted as an analog signal over a radiowave transmission section between a coupling device (a master set) and a cordless telephone set (a slave set); at present, a digital type cordless telephone system which digitizes the radiowave transmission section to further enhance the performance of the system is being studied as a second-generation cordless telephone system.

There has been proposed a TDMA-TDD system as one of transmission systems for digitizing the radiowave transmission section.

The TDMA-TDD system is a communication system which utilizes, for transmission and reception of signals between a master and a slave set, a TDD (Time Division Duplex) system in which the master set and the slave set are allowed to use the same carrier frequency for duplex use of one channel on a time-division basis and in which one master set and a plurality of slave sets are controlled by a TDMA (Time Division Multiple Access) system.

The above-mentioned TDD transmission system is also called a TCM (Time Compression Multiplexing transmission) system and may sometimes be called a Ping-Pong transmission system after its time control method.

Generally speaking, in case of a mobile communication, a distance between a mobile station and a base station changes every moment as the mobile station moves and their receiving electric field intensities vary with the position of the mobile station, and hence their received inputs undergo substantial changes accordingly. In the case of a cordless telephone, a slave set (a mobile set) is sometimes brought into close proximity with a master set (a controller), so that their received input levels exceed respective normal levels. In this instance, the existing analog cordless telephone set suffers only degradation of the regenerated or reproduced speech quality, but in the case of the digital cordless telephone of the TDMA-TDD system there is a fear that the detection of a synchronization signal, such as burst synchronization or TDD synchronization, is disturbed, making reception impossible. For example, the received input level is set such that the receiving circuit operates normally in the range of the received critical level (the minimum level at which reception is possible) of 10 dB/$\mu$V to the maximum level of 70 dB/$\mu$V, but in the case where the slave set is brought close to the master set and the maximum level exceeds 70 dB/$\mu$V and enters into the range of 100 to 120 dB/$\mu$V, the reproduced speech quality is seriously deteriorated, besides no signals can be received.

To solve this problem, the slave set and the master set are designed as described below.

FIG. 5 is a circuit diagram showing an example of the principal part of a conventional transceiver. In FIG. 5 reference numeral 1 denotes a duplexer, 2 a receiver (Rx), 3 a transmitter (Tx), 4 a switch controller for the duplexer 1, 5 a controller and 8 a variable attenuator.

The controller 5 controls the operation of the entire transceiver circuit and always detects the received input level by its internal logic IC and, when the received input level exceeds a given maximum level and the input level exceeds a normal level, the controller applies a control signal to the variable attenuator 8 to increase an attenuation value, putting the input level of the receiver 2 into the given range.

That is, the variable attenuator 8 is provided at the input side of the receiver 2 and its attenuation value is controlled automatically or semi-automatically to prevent the reproduced speech quality from being impaired when the input is excessive.

The variable attenuator 8 is formed as an electronic variable attenuator using an FET or PIN diode and is very effective for an over input level, but when the received input level is so low as to reach the critical level, that is, when the attenuation value by the variable attenuator 8 is minimum, it provides an attenuation (an insertion loss) of about 1 to 2 dB, causing an increase in the noise figure of the receiver. Consequently, the receiving sensitivity decreases in correspondence to the insertion loss so that the synchronizing operation becomes unstable, reducing the service area.

SUMMARY OF THE INVENTION

An object of the present invention is to provide a radio transceiver of the TDMA-TDD system which maintains its service area by avoiding reduction of the receiving sensitivity by the variable attenuator when the received level is low and which prevents the deterioration of the reproduced speech quality and the occurrence of the state of reception being impossible when the input level exceeds a normal level.

The radio transceiver according to the present invention, which is of the type wherein a transmitter and a receiver are connected via a duplexer to an antenna and a controller for controlling the entire transceiver operation controls the duplexer to be switched to either the transmitter or receiver, is characterized in that the controller has a construction wherein during transmission it activates the duplexer to switch the antenna to the transmitter; during reception it activates the duplexer to switch the antenna to the receiver; and when the received input level exceeds a predetermined maximum input level of the receiver, it activates the duplexer to switch the antenna to the transmitter to provide a leakage received power of the duplexer to the input of the receiver.

BRIEF DESCRIPTION OF THE DRAWINGS

The present invention will be described in detail below with reference to the accompanying drawings, in which.

DETAILED DESCRIPTION OF THE INVENTION

Figure 1:
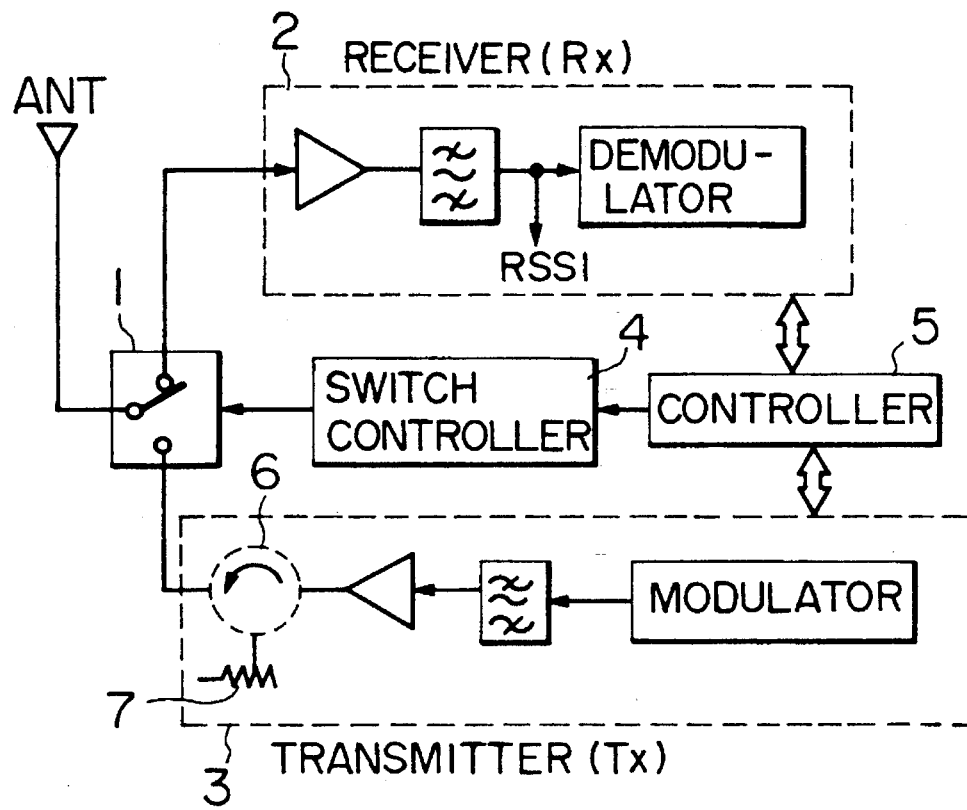
FIG. 1 is a block diagram illustrating an embodiment of the present invention.
Figure 5:
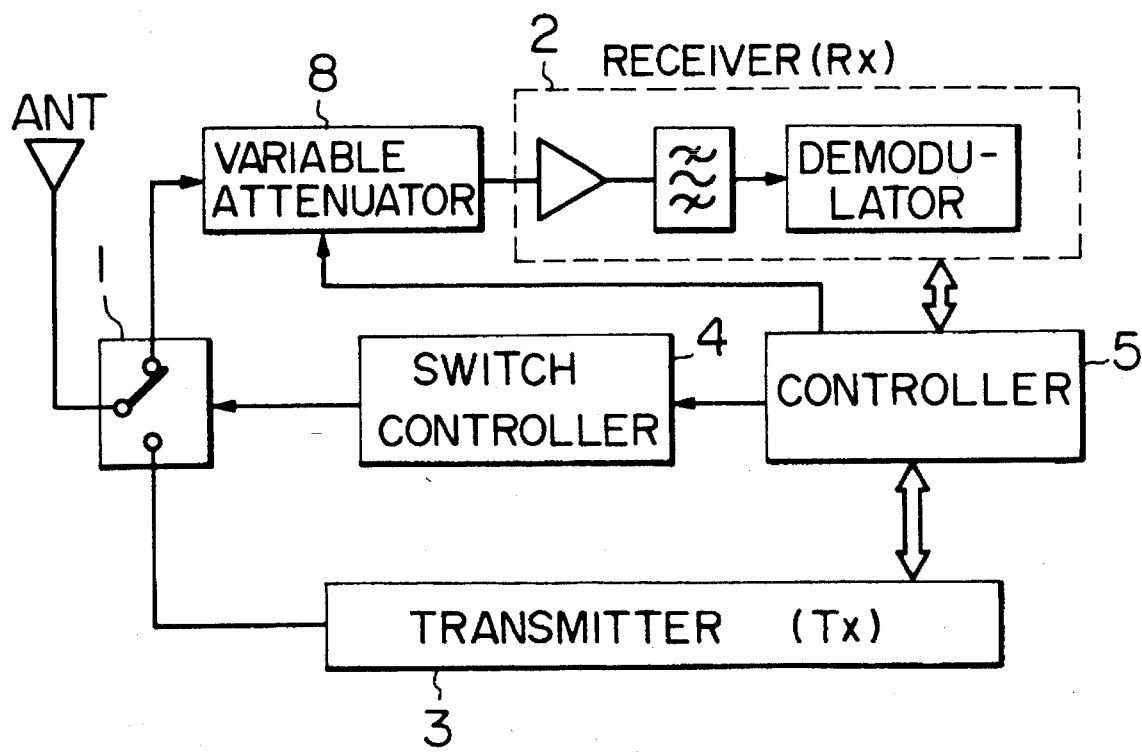
FIG. 5 is a block diagram illustrating an example of a conventional radio transceiver.

With reference to FIG. 1 illustrating an embodiment of the present invention, reference numerals 1 through 5 denote the same parts as those in the prior art example of FIG. 5. This embodiment differs from the conventional arrangement of FIG. 5 in that the variable attenuator 8 which causes an insertion loss is omitted and in that the switching control operation of the duplexer 1 by the switch controller 4 differs from that in the prior art. Reference numeral 6 denotes an isolator provided in the transmitter 3 and 7 a termination.

Figure 2:
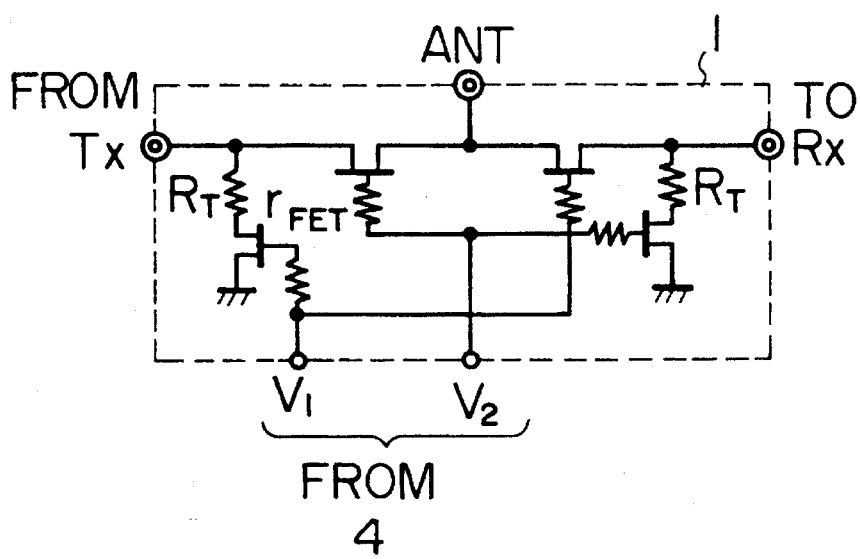
FIG. 2 is a circuit diagram illustrating an example of a duplexer employed in the embodiment shown in FIG. 1.

FIG. 2 is a circuit diagram showing an example of the duplexer 1. This is a circuit called an SPDT (Single Pole Double Throw) switch. Reference characters $V_1$ and $V_2$ represent control represent control voltages which are provided from the switching controller 4. For example, when $V_1=0$ V and $V_2=-5$ V, the transmitter T(x) is turned ON (whereas the receiver R(x) is turned OFF), and when $V_1=-5$ V and $V_2=0$ V, the transmitter T(x) is turned OFF (whereas the receiver R(x) is turned ON.

Figure 3:
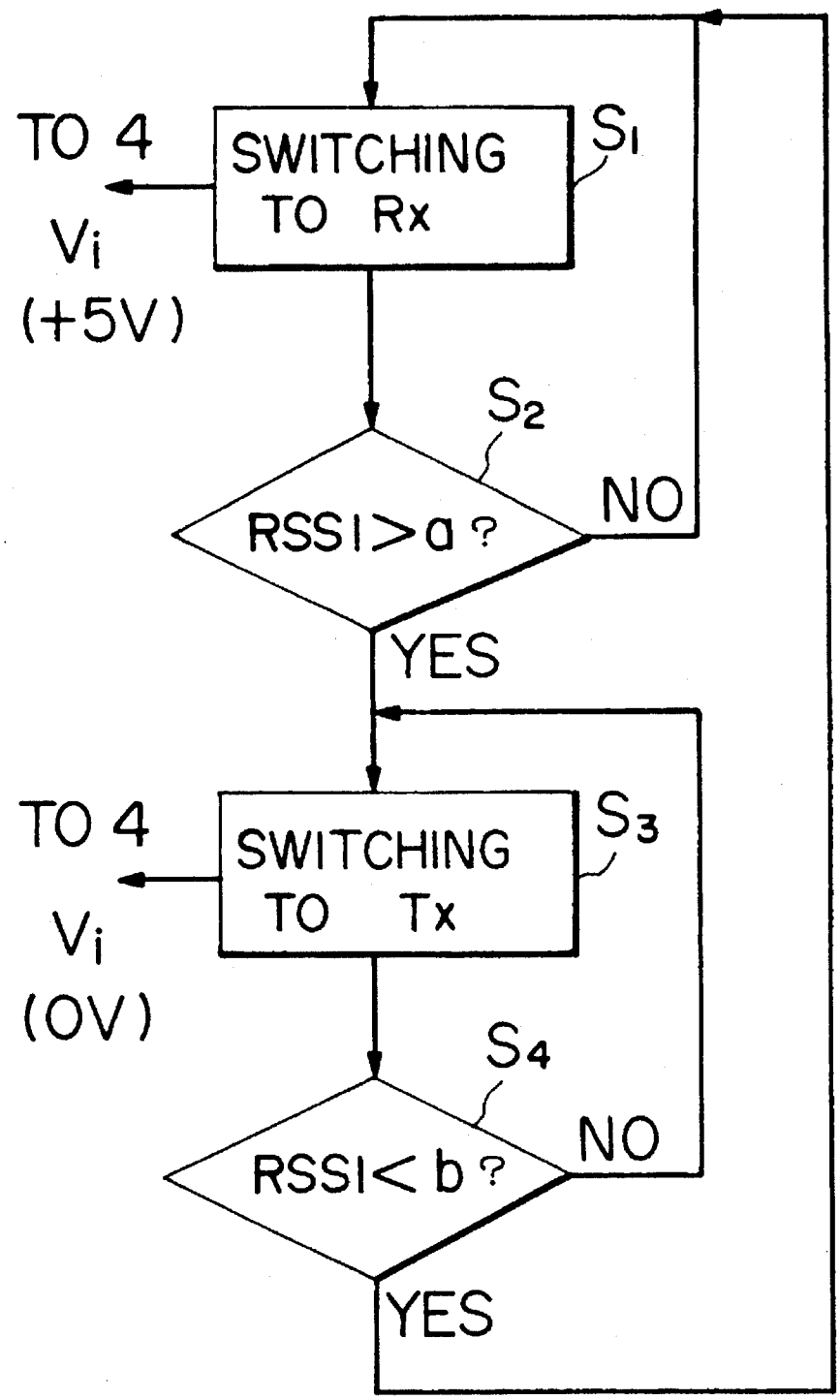
FIG. 3 is a flow-chart explanatory of the operation of the embodiment shown in FIG. 1.

A description will be given of the operation of an example of the present invention shown in FIG. 1, especially of a controller 5, an example of such as a computer, with reference to FIG. 3.

When the received input is a very low input level near the critical point, a predetermined receiving sensitivity is maintained and an excellent received reproduced output can be obtained without reduction of the service area, because the present invention does not employ the conventional variable attenuator which decreases the receiving sensitivity.

Next, when the received input level exceeds a normal level at a receiving state ($S_1$), that is, when RSSI (Receiving Signal Strength Indicator) level exceeds an allowable maximum value (i.e. a threshold level $\underline{a}$) of the received input level range ($S_2$) which is, for example, 70 dB/μV, the duplexer 1 is switched ($S_3$) by the switching controller 4 to the transmitter (Tx side). In the radio frequency band of the radiowave transmission section of the digital cordless telephone system, for example, in 1 to 2 GHz band, even if the duplexer circuit 1 depicted in FIG. 2 is switched to the transmitter (Tx) to turn OFF the receiver (Rx), the receiver is not completely cut off and has a certain backward loss of about 20 to 30 dB due to leakage through the duplexer circuit, and consequently, a leakage signal received power attenuated by about 20 to 30 dB of the over-level input from the antenna (ANT) is input into the receiver 2, which is caused to perform its normal operation, thus maintaining the quality of reproduced speech unchanged.

As mentioned above, the duplexer 1 is connected to the transmitter during transmission and when the received input level exceeds a normal level and it is connected to the receiver when the received input level is below the allowable maximum level ($S_4$), that is, the RSSI level is below a threshold level $\underline{b}$ ($\underline{b}<\underline{a}$), at which the receiver 2 performs its normal operation.

Incidentally, the duplexer circuit can be formed into a terminated type or an open type. The terminated type circuit is terminated with $R_T+\gamma_{FET}=50$ Ω, as shown in FIG. 2. The open type circuit is an opened state when it is opened, but since a transmission line of a predetermined electrical length is provided at the transmitter and since the transmitter is terminated with the termination 7 of the isolator 6 of the transmitter 3, there is no fear of incurring abnormal oscillation and the leakage to the receiver is kept constant.

Figure 4:
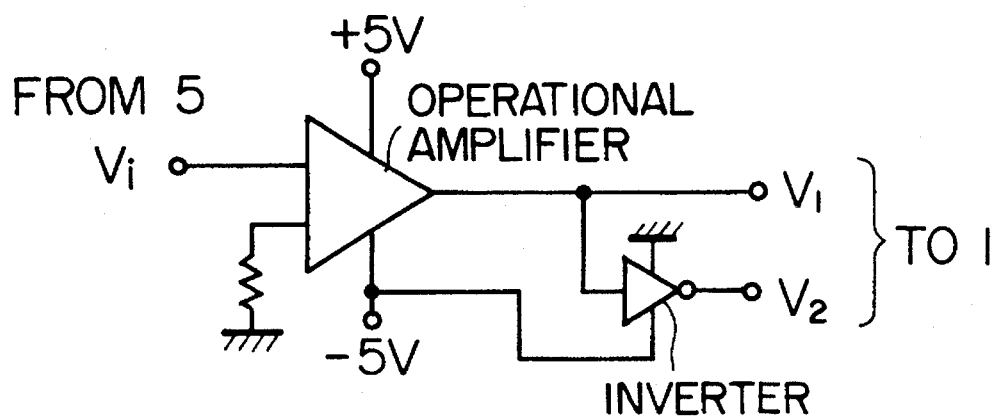
FIG. 4 is a circuit diagram illustrating an example of a switch controller employed in the embodiment shown in FIG. 1.

The switch controller 4 can be comprised, as shown in FIG. 4, which assumes a state I ($V_1=-5$ V, $V_2=0$ V) or a state II ($V_1=0$ V, $V_2=-5$ V) in response to +5 V, 0 V of an input $V_i$ from the controller 5, respectively.

As described above in detail, the present invention produces such effects as listed below.

(1) It is possible to maintain the excellent reproduced speech quality by the normal operation of the receiver without providing a variable attenuator for an over-level input.

(2) The nonuse of the variable attenuator saves the need of controlling the attenuation corresponding to the over-level input, alleviating the burden on the controller accordingly.

(3) Even when the received input is a very low one near the critical point, the receiving sensitivity does not decrease because of no insertion loss by the variable attenuator and a desired service area can be maintained.

(4) The nonuse of the variable attenuator saves the mounting space, and hence greatly serves for miniaturization of the device and reduction of its cost.

(5) A decrease in the number of parts used reduces the failure rate of the device, and hence enhances its reliability.

What we claim is:

1. A radio transceiver comprising:

a transmitter;

a receiver;

an antenna;

a duplexer for switching the antenna to an output of the transmitter or an input of the receiver;

a controller for developing a control output of a state I when received signal strength level reduces below a predetermined threshold level and for developing the control output of a state II when the received signal strength level exceeds a predetermined maximum threshold input level of the receiver greater than said predetermined threshold level;

a switch controller for activating the duplexer so that the antenna is connected to the input of the receiver in response to the control output of the state I from the controller, and the antenna is connected to the output of the transmitter through the duplexer while a leakage received power through the duplexer from the antenna is applied to the input of the receiver in response to the control output of the state II.

2. In a radio transceiver, comprising a radio transmitter; a receiver; an antenna; a duplexer connected between the transmitter and the receiver for selectively coupling the antenna to the transmitter during transmission and selectively coupling the antenna to the receiver during reception; the improvement which comprises:

a controller for developing a control output of a state when a received signal strength level reduces below a predetermined threshold level and for developing the control output of a state II when the received signal strength level exceeds a predetermined maximum threshold input level of the receiver greater than said predetermined threshold level;

a switch controller for coupling the antenna to said transmitter and to said receiver during transmission and reception operations respectively of the transceiver and activating said duplexer to couple said antenna to said receiver in response to the control output of the state I from the controller and to couple the antenna to the transmitter in response to the control output of the state II from the controller so that a leakage received power through said duplexer from said antenna is provided as an input to said receiver.

\* \* \* \* \*